UNITED STATES PATENT OFFICE 2,423,475

INTERNAL SURGICAL DRESSING

Claude W. Bice and Majel M. MacMasters, Peoria, Ill., assignors to the United States of America, as represented by the Secretary of Agriculture No Drawing. Application July 27, 1944, Serial No. 546,901

3 Claims. (Cl. 128—270)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to surgical dressings, and has among its objects the utilization of a starch material which gives a superior product for this purpose.

It is known that many starch pastes become spongy in nature when frozen and thawed, and the use of frozen, gelatinized starches in paper manufacture and in foods has been suggested.

According to this invention, it has been discovered that sponges prepared by freezing starch pastes in the known manner and by other proper treatment have characteristics which make them useful as absorbable surgical dressings in deep or surface wounds and operative cases. The material of such sponges consists substantially of starch and has the structural form of a sponge, that is, it has interconnected pores similar to a marine sponge. Such starch sponges are soft, pliable and highly absorbent. When dried, they become quite brittle, but will not break if carefully packed, and if carefully air dried while maintaining their form, they readily return to their original state when remoistened.

When immersed in water, starch sponges are moderately strong, and they slowly disintegrate if subjected to any mechanical strain. However, when retained in alcohol, as for example, in 70 percent alcohol used to maintain aseptic conditions, the sponges remain soft and pliable, but they are strong and retain their original structure almost indefinitely even when subjected to mechanical strain such as shaking, bending, and so forth. Consequently, the sponges can be stored for months in 70 percent alcohol without any visible degradation.

Portions of dried sponge have been found to disperse in 4 hours to 7 hours when held at 37° C. in beef blood serum, buffered at pH 7.6 to 7.0, and in about 6 days when moistened with sterile water and implanted in the omentum of a cat. Intrablood medicaments, such as penicillin, gramicidin, or sulfapyridine, can be introduced into these sponges in solution which will be held in the pores of the sponge; and, in addition, considerable of the medicament may be adsorbed from the solution onto the surfaces of the fibers and films composing the sponge. It has been found that, when implanted in living animal bodies, starch sponges dissolve slowly in the body fluids over a period of several days, and the dissolved material is absorbed by the tissues without harmful results. Starch is closely related to glycogen, the carbohydrate stored in the human liver, and is, therefore, a substance not wholly foreign to the body.

Details of the preparation of the sponge are, briefly, as follows: An aqueous suspension of starch is pasted by heating to 90° C. or above. Starches such as those from corn, wheat, sorghum, barley, oat, rye, rice, waxy or glutinous corn or sorghum, white potato, tapioca, sweetpotato, sago, canna, or arrowroot can be used. The coarseness and strength of the sponge depend in part upon the kind of starch from which it is made. The starch concentration may be 2 percent or more, depending upon the kind of starch used and the sponge characteristics desired. Five-percent corn starch pastes have been found preferable. Although it is not necessary to autoclave the paste in order to obtain a sponge, to do so is desirable, since the product is then stronger, more finely porous, and more uniform, and the paste is thus rendered sterile. Autoclaving for 15 to 20 minutes at 15 pounds gauge pressure per square inch is satisfactory.

The starch paste is then rapidly cooled and slowly frozen. Coarser, stronger sponges are obtained with higher freezing temperatures. The possible temperature range for freezing is about from 0° to —25° C., but the practical range for obtaining an acceptable product is about from 0° to —12° C. A range about from —0.1° to —1.0° C. is preferred.

At any time after freezing is complete, the paste is thawed. Thawing may be carried out at room temperature, or it may be hastened, as by immersing the freezing vessel in warm water. However, the sponge itself should not be heated much above room temperature.

After thawing, the spongy product may be prepared for use in any one of several different ways:

(1) It may be placed directly in 30 to 100 percent alcohol (70 percent is preferred), and be thus kept antiseptic. When required for use, the alcohol may be mechanically removed, as by pressing or centrifuging from the sponge, which may then be washed free of residual alcohol by immersion in a series of water or other liquid baths, being pressed or centrifuged nearly dry after each washing. It may then be impregnated for use by moistening, either by immersion or spraying, with a solution of the desired medicament to incorporate the medicament into the pores of the sponge.

(2) The water may be mechanically removed from the thawed sponge, and the sponge further air dried, preferably, but not necessarily, under vacuum without disturbing its form. If desired, the dried sponge may then be sterilized by autoclaving, and be stored. When required for use, the dried sponge may be moistened with a solution of the medicament, which it absorbs and which is incorporated into the pores of the sponge, at the same time returning to its original soft and pliable state.

(3) The water may be mechanically removed to the desired extent from the thawed sponge and the sponge immediately immersed in, or sprayed with, a solution of the medicament to incorporate the medicament into the pores of the sponge. If immersed, it may be thus stored and withdrawn when needed for use.

(4) The water may be removed from the thawed sponge, the sponge washed once or more times with alcohol of any desired concentration, the alcohol mechanically removed, the sponge air dried and, when required for use, remoistened with a solution of the medicament to incorporate the medicament into the pores of the sponge.

(5) The thawed sponge may be placed directly in alcohol, and freed therefrom by pressing or centrifuging when required for use, and then be impregnated with a solution of the medicament to incorporate the medicament into the pores of the sponge.

(6) The water may be mechanically removed from the thawed sponge, the sponge air dried, and medicinal dusts or powders blown into the pores of the sponge. When required for use, the sponge may be moistened with just sufficient liquid to permit its return to its original soft and pliable state.

(7) The water may be mechanically removed from the thawed sponge and, either before or after further air drying, the sponge may be impregnated with a solution of the medicament to incorporate the medicament into the pores of the sponge. The sponge may then be further air dried and when required for use, be moistened with just sufficient liquid to permit its return to its original soft and pliable condition.

(8) The thawed sponge may be sterilized by passing through one or more alcohol washes and the alcohol largely removed by pressing or centrifuging. The sponge may, if desired, be further washed once or more with water or other liquid and the greater part of the liquid be mechanically removed therefrom. It may then be further air dried, or not, as desired, and impregnated with the medicament to incorporate the medicament into the pores of the sponge, and then completely air dried.

Having thus described the invention, what is claimed is:

1. The process of forming a surgical dressing which may be implanted in living animal bodies and be absorbed by the body fluids, comprising incorporating an intra-blood medicament into the pores of a material consisting substantially of starch and having the structural form of a sponge.

2. The process of forming a surgical dressing which may be implanted in living animal bodies and be absorbed by the body fluids, comprising drying a material consisting substantially of starch and having the structural form of a sponge, and when required for use, incorporating an intra-blood medicament into the pores of the material.

3. A surgical dressing which may be implanted in living animal bodies and be absorbed by the body fluids, comprising a material consisting substantially of starch and having the structural form of a sponge and an intra-blood medicament incorporated into the pores of the material.

CLAUDE W. BICE.
MAJEL M. MacMASTERS.

REFERENCES CITED

The following references are of record in the file of this patent:

UNITED STATES PATENTS

| Number | Name | Date |
|---|---|---|
| 2,137,169 | Levey | Nov. 15, 1938 |
| 2,072,303 | Herrmann et al. | Mar. 2, 1937 |

OTHER REFERENCES

Science for Sept. 8, 1944, pp. 227–8.
Annalen Der Chemie for 1844, pp. 315–16. (Copy in Patent Office Library.)
Science New Letter for July 17, 1943, pp. 35–36.